United States Patent [19]

Schurmans et al.

[11] Patent Number: 4,670,187

[45] Date of Patent: Jun. 2, 1987

[54] METHANOL REFORMING PROCESS AND APPARATUS FOR PRACTICING IT

[75] Inventors: Jacques Schurmans, Brussels; Herman Neukermans, Keerberger, both of Belgium; Jacques Quibel, Maisons-Lafitte; René Dupont, Douai, both of France

[73] Assignees: Societe Chimique de la Grande Paroisse, Azote Products Chimiques, Brussels, Belgium; Catalysts and Chemical Europe, Paris, France

[21] Appl. No.: 790,479

[22] Filed: Oct. 23, 1985

[30] Foreign Application Priority Data

Oct. 30, 1984 [FR] France ................................ 84 16561

[51] Int. Cl.$^4$ ............................................. C01B 3/32
[52] U.S. Cl. .................................. 252/373; 422/189; 165/104.14
[58] Field of Search ........................................ 252/373

[56] References Cited

FOREIGN PATENT DOCUMENTS 1098315 3/1981 Canada .
2490615 8/1981 France .

Primary Examiner—Howard T. Mars
Attorney, Agent, or Firm—Browdy and Neimark

[57] ABSTRACT

The invention relates to a methanol reforming process, and apparatus in which the methanol reforming is conducted in at least two stages, with a circulating double passage of the reactant mixture of the first reforming stage inside the residual gas combustion zone. The entire reaction is conducted in adiabatic operating conditions.

The process is useful for obtaining gas with a strong hydrogen content.

7 Claims, 6 Drawing Figures

METHANOL REFORMING PROCESS AND APPARATUS FOR PRACTICING IT

FIELD OF THE INVENTION

The present invention relates to a methanol reforming process for obtaining a gas with a high hydrogen content and apparatus for performing the process.

A methanol reforming process has been studied to obtain gas containing high concentrations of hydrogen, the remainder of the gas being composed of carbon dioxide, methane, steam and possibly nitrogen, especially wherein a process is performed of cracking mixtures into variable proportions of steam and methanol vapor. The process may optionally be performed in the presence of nitrogen, or of air and recycled gases, after optional separation of certain components, and of gas coming from outside of the unit.

BACKGROUND OF THE INVENTION

In the methanol reforming field, there is known particularly from European application EPA No. 0003737, a process for producing city gas with a high methane content, by catalytic reaction of methanol with steam, with formation of a liquid mixture of water and liquid methanol in a ratio by weight of 0.5 to 1.5 : 1; with heating and vaporizing of said mixture; and reaction of the vaporized mixture under a pressure of 10 to 50 bars at a temperature between 300° and 500° C., in a fixed-bed reactor consisting of a nickel catalyst.

According to French patent No. 2,490,615, the cracking operation is conducted between 130° to 950° C., under pressures between 1 and 100 bars, in the presence of at least two types of catalysts, the first more particularly intended for cracking of methanol, the second and following types being suited for the conversion of the gas products of the cracking reaction into gas products such as hydrocarbons, carbon dioxide, carbon monoxide, reducing gases, synthesis gases and hydrogen, the steam/methanol and carbon dioxide/methanol molar-ratios being between 0.2 and 10. The steam reforming reaction is conducted in the presence of carbon dioxide, by direct addition of this gas, recycling, or combination of the two modes of introduction. The application of heat during the steam reforming operation is performed by a heat exchanging fluid, circulating concurrently with the fluids of the process, said fraction being the residual gas of a purification of the gas produced to obtain pure hydrogen.

SUMMARY OF THE INVENTION

The apparatus for practicing this reforming process essentially comprises a tubular reactor placed between a vaporizer of the reaction mixture and a heat exchanger between the exiting gases and the feeding liquid, a condenser and a purification unit and, in addition, a furnace for combustion of residual gas for purification.

While maintaining the thermal autonomy of the process when steam reforming of the methanol and the purification on molecular sieve is incorporated into a production of hydrogen, means have been found making it possible to bring the purification yield to 80%, to decrease the consumption of methanol by several percent, to reduce substantially the investment costs in material and catalyst especially for large installations without limiting their capacity, and to use methanol that is impure, even contaminated by organic impurities, as a source of hydrogen.

In addition, certain means make it possible to achieve significant savings in heat input, a smaller comsumption of energy and a reduction of energy losses, as well as an increase in the reforming reaction speed.

The process involves performing the vaporizing and superheating of the methanol-water reaction mixture directly in the combustion zone of the residual gas for purification. The purification yield can reach 75%, the process remaining thermally autonomous, with a gain of 4% on methanol comsumption and possibly the elimination of a heat-exchanging fluid.

By increasing the superheating of the methanol-water vapors to 500° C., the reforming reaction speed significantly increases in the 300°–500° C. temperature level zone, which makes it possible to reduce the catalyst volume, and to work in adiabatic operating conditions up to 300° C.

In a methanol reforming process, having at least two stages, by subjecting the methanol-water reaction mixture to vaporizing and suberheating, at a temperature between 300° and 500° C., performed directly in the combustion zone of the residual gas, very considerable improvements are obtained. By superheating twice, by double passage, or circulation of the reactant mixture and the mixture leaving the first reforming stage in the combustion zone of the residual gas, the entire reforming reaction can be performed under adiabatic operating conditions.

Conducting the reforming process under adiabatic operating conditions exhibits considerable advantages, consisting particularly in the replacement of the tubular reactor with two simple reactors of the vertical cylindrical container type containing a catalyst bed in contact with the body of force. This replacement represents a very significant reduction in the investment costs especially for the large production units on the order of several thousand Nm$^3$/h. of hydrogen. Because of this there practically appears no longer to be an upper limit for the capacity of these installations.

Conducting the reforming process in adiabatic operating conditions has the advantage of eliminating the entire loop of the heat-exchanging fluid with its accessories such as recirculation pumps, an expansion vessel, and additional exchangers placed on the methanol-water circuit. This is also reflected in an investment savings for equipment. In addition, the volume of catalyst in an adiabatic reactor is smaller in a tubular reactor, and a financial savings also follows from use of less catalyst.

Superheating of the reactants at the same time under the same conditions as before can be sufficient to supply all the heat necessary for the reaction in a single reactor by recycling.

However, in certain cases a booster fuel can provide the additional heat necessary for the thermal balance of the adiabatic system.

Further, a heat exchanging fluid coming from the production of the industrial installation can supply the addition of heat necessary for the second stage of the reforming reaction. Under these conditions, with coupling of a tubular reactor to an adiabatic reactor, the purification yield can be raised to its maximum on the order of 80%. This purification yield can be obtained in each of the preceding modes of use with the addition of a booster fuel.

When the production is oriented toward a particular gas having a given composition, very different from the standard $CO_2 + 3H_2$ proportions, it is possible to resort, in the form of addition, to the recycling either of a fraction of the gas current coming from the reforming reaction, or of a gas current coming from outside or from the combination of the two gas flows.

It is also possible to process impure methanol, contaminated by organic impurities such as higher alcohols, fatty materials, etc., which prevents, in the case of catalytic hydrogenations, the use of methanol as diluent and/or solvent, for redistilling it. Thus, a contaminated methanol solution can be upgraded as a hydrogen source by adapting the means for practicing the reforming process to the type of impurity.

The presence of heavy products in the methanol involves a potential risk of carbon formation.

In a reforming in two stages, this risk can be avoided by introducing only a fraction of the methanol and all of the steam in the first reforming stage in adiabatic operating conditions, the methanol, after vaporizing and superheating, being added to the gas mixture coming from the first reforming stage, before its entry into the second reforming stage.

By introducing only a part of the methanol and all the water in a first reactor, the steam/carbon molar ratio is considerably larger and thus the partial pressure of the heavy products is reduced, avoiding the risk of carbon formation.

Processing an impure methanol solution whose impurities are sensitive to high temperatures requires conducting the reforming under relatively mild conditions with temperature control without significant superheating of the reactants. Practicing the steam reforming process in adiabatic operating conditions in at least three reaction zones in series does not cause any significant superheating of the reactants at the intake of the reactors. Practicing the steam reforming process at a temperature on the order of 430° C. makes processing possible under satisfactory conditions fcor a methanol solution contaminated by impurities sensitive to high temperatures.

DESCRIPTION OF THE DRAWINGS

In the figures of the attached drawings, several examples of embodiment of installation are given according to this improvement, the numbered references agreeing with those of the single figure of patent FR No. 2,490,615.

In FIG. 1, the feed liquids, the methanol and the water introduced respectively at (1) and (2) are heated and partially evaporated in heat exchanger (3) by heat exchange with the gas leaving tubular reactor, (5), said exiting wet gas then being cooled in condenser (6) before entering the purification unit not shown. Separator (6A) collects the condensate exiting by pipe (12). The residual gas leaves the purification installation by pipe (13) before circulating to combustion furnace (8), to be burned there. The flue gases escape at (9) while the heat is recovered directly inside the furnace by the mixture of the reactants: methanol, steam circulating in the heat exchange device of the coil type (4A) which serves as a vaporizer and superheater of the reaction mixture, and by the heat exchanging fluid circulating in a heat exchange device of the coil type (4B) for heating reactor (5).

Figure 2:
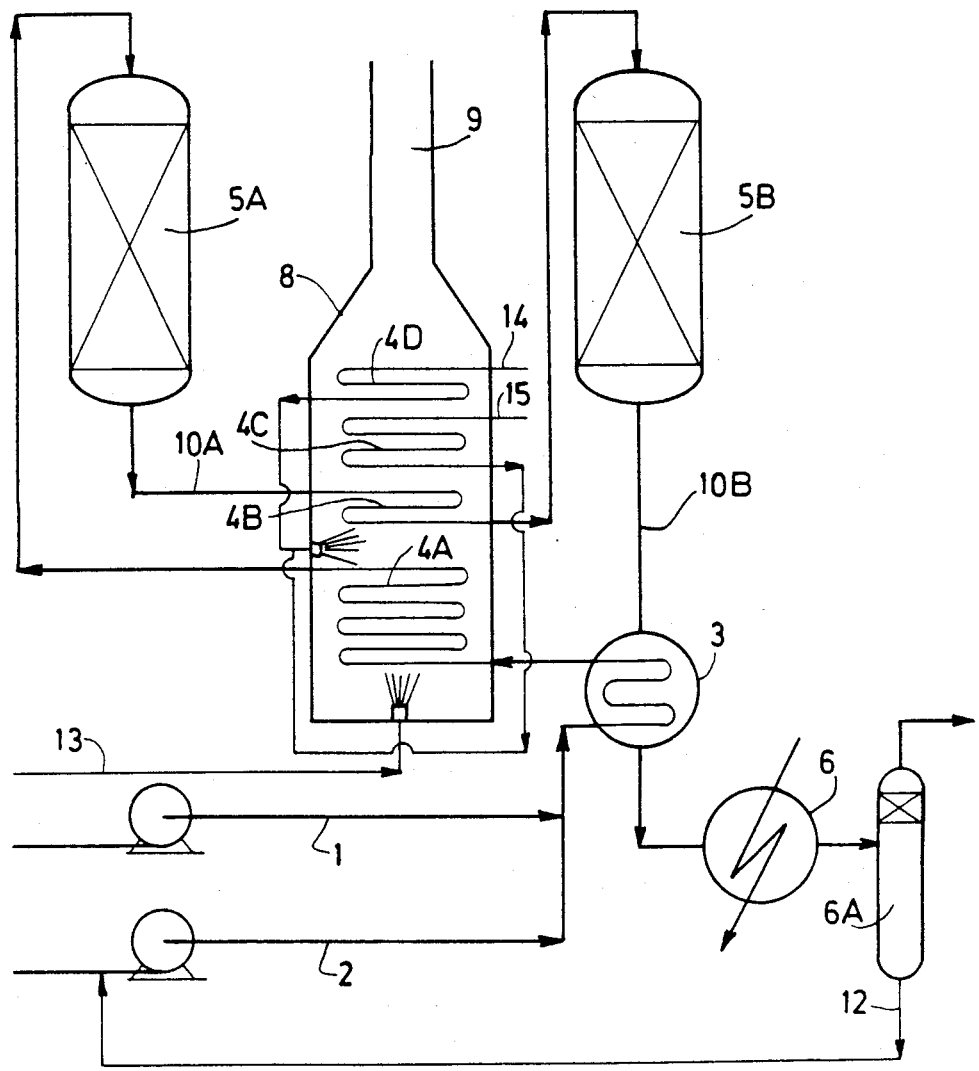
FIG. 2 shows an apparatus for superheating the methanol-steam reactants in an adiabatic system.

The installation according to FIG. 2 illustrates the superheating of the methanol-steam reactants in two stages and the operation in an adiabatic system with replacement of the tubular reactor with adiabatic reactors. The system is thermally balanced by combustion of a booster fuel with air, by a burner inside furnace (8). The residual gas is brought by pipe (13) to combustion furnace (8) to be burned there, the heat is recovered from the mixture of the reactants coming from heat exchanger (3) and circulating in coil (4A), and this superheated mixture is subjected to a first reforming stage in adiabatic reactor (5A). The gases leaving reactor (5A) by pipe (10A) then circulating in coil (4B) are superheated before being processed in second adiabatic reactor (5B) in series with (5A). Booster fuel fluid (14) and combustion air (15) are respectively preheated in the superheating devices of the coil type (4D) and (4C) inside furnace (8), before combustion.

Figure 3:
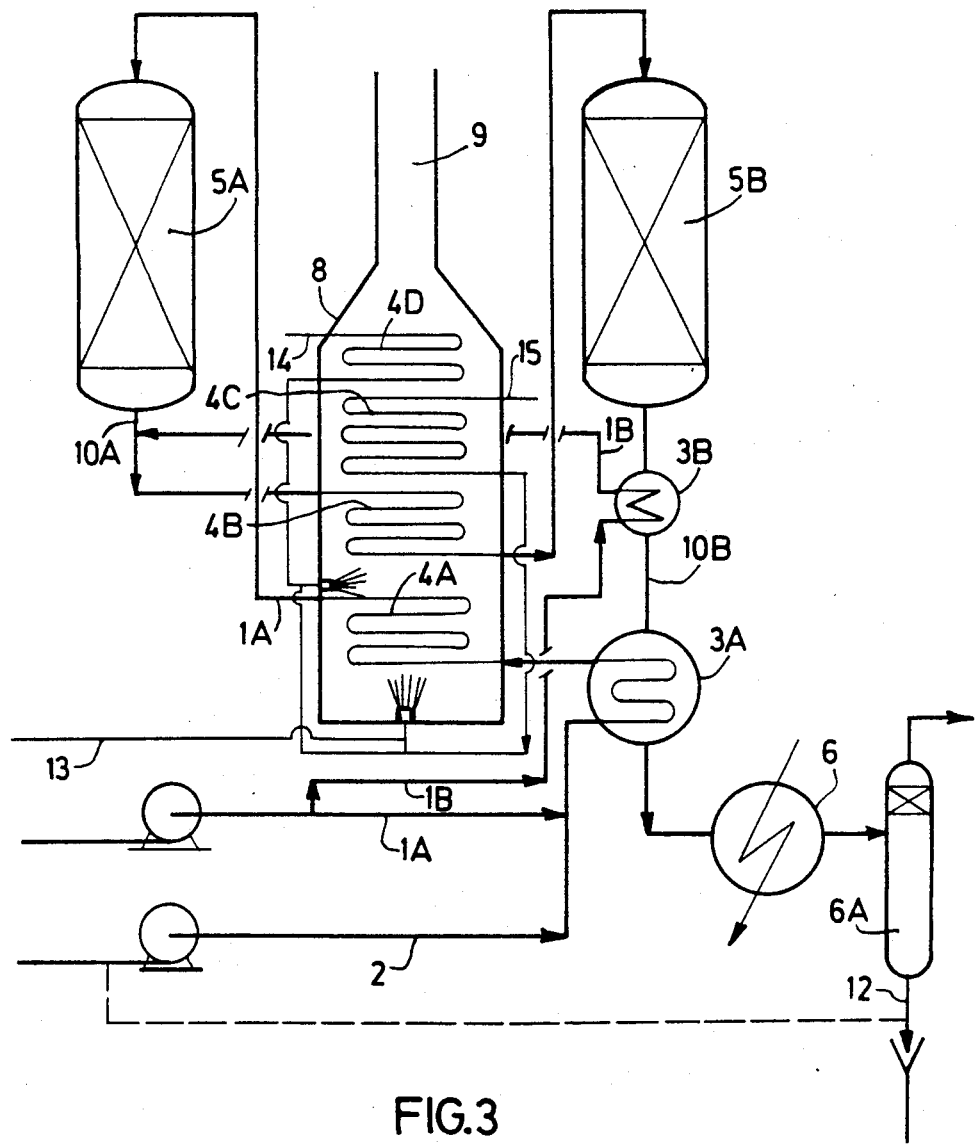
FIG. 3 shows an apparatus for reforming impure methanol having two adiabatic reactors in series.

FIG. 3 illustrates an installation making possible the processing of impure methanol, contaminated by organic impurities, characterized by two adiabatic reactors in series (5A) and (5B). As before, inside combustion furnace (8) by superheating devices of the coil type (4A) and (4B) has the same function as in the installation of FIG. 2. Preheating devices (4D) and (4C) of the booster fuel fluid (14) and of combustion air (15) are also shown. The installation comprises two pipes (1A) and (1B) for introducing the methanol, a first heat exchanger (3A) in which a fraction of the methanol and all of the water are heated and partially evaporated, and a second heat exchanger (3B) in which the other fraction of the methanol added to the gas coming from the first reforming stage is heated in pipe (10A).

Figure 4:
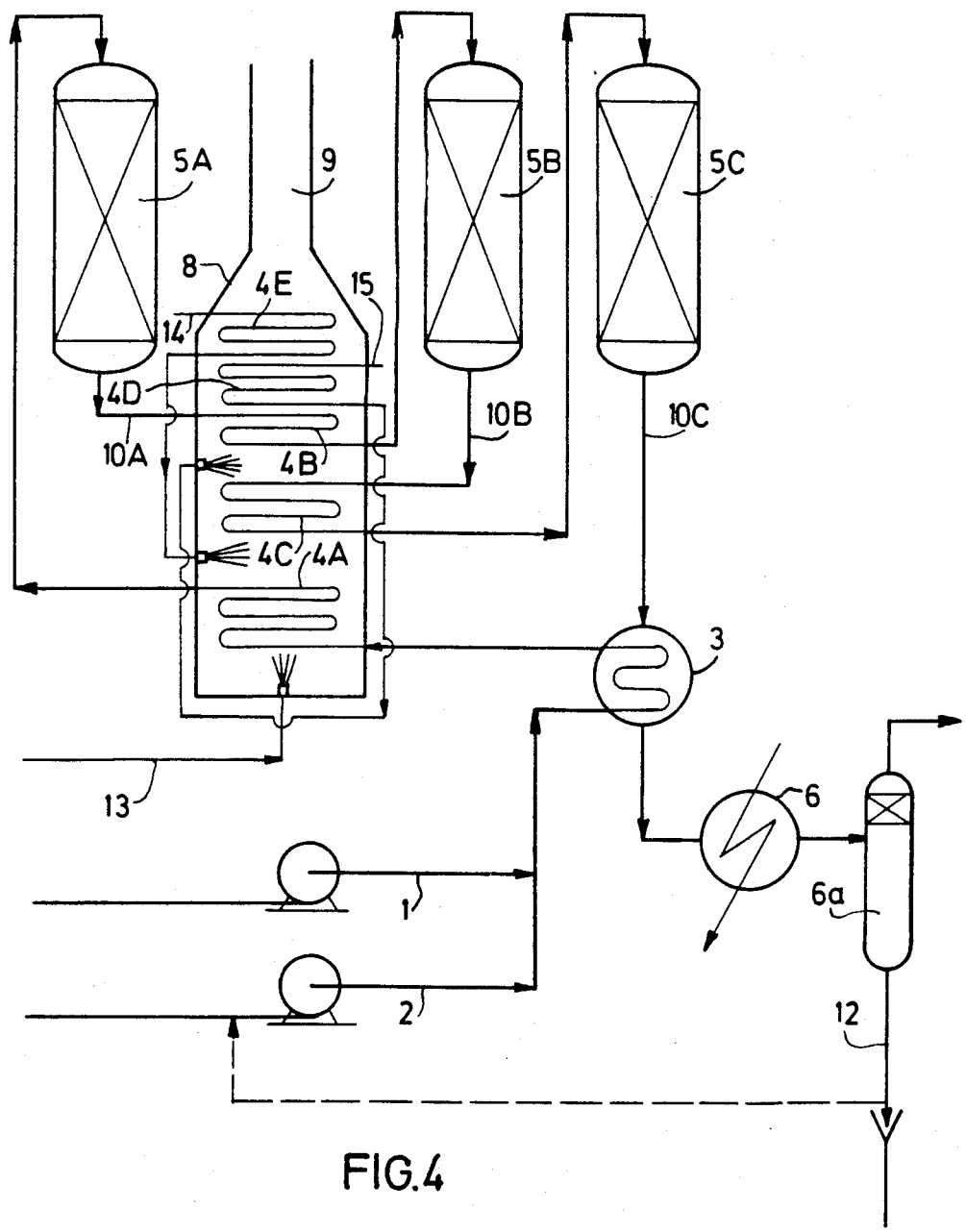
FIG. 4 shows an apparatus for reforming impure methanol comprising three adiabatic reactors.

FIG. 4 illustrates an installation making it possible to process an impure methanol contaminated by impurities sensitive to heat. The installation has three adiabatic reactors (5A), (5B), (5C) in series and coils (4A), (4B), and (4C) for superheating the reactants and the mixtures coming from the primary and secondary reformings, located inside the combustion furnace (8).

Figure 5:
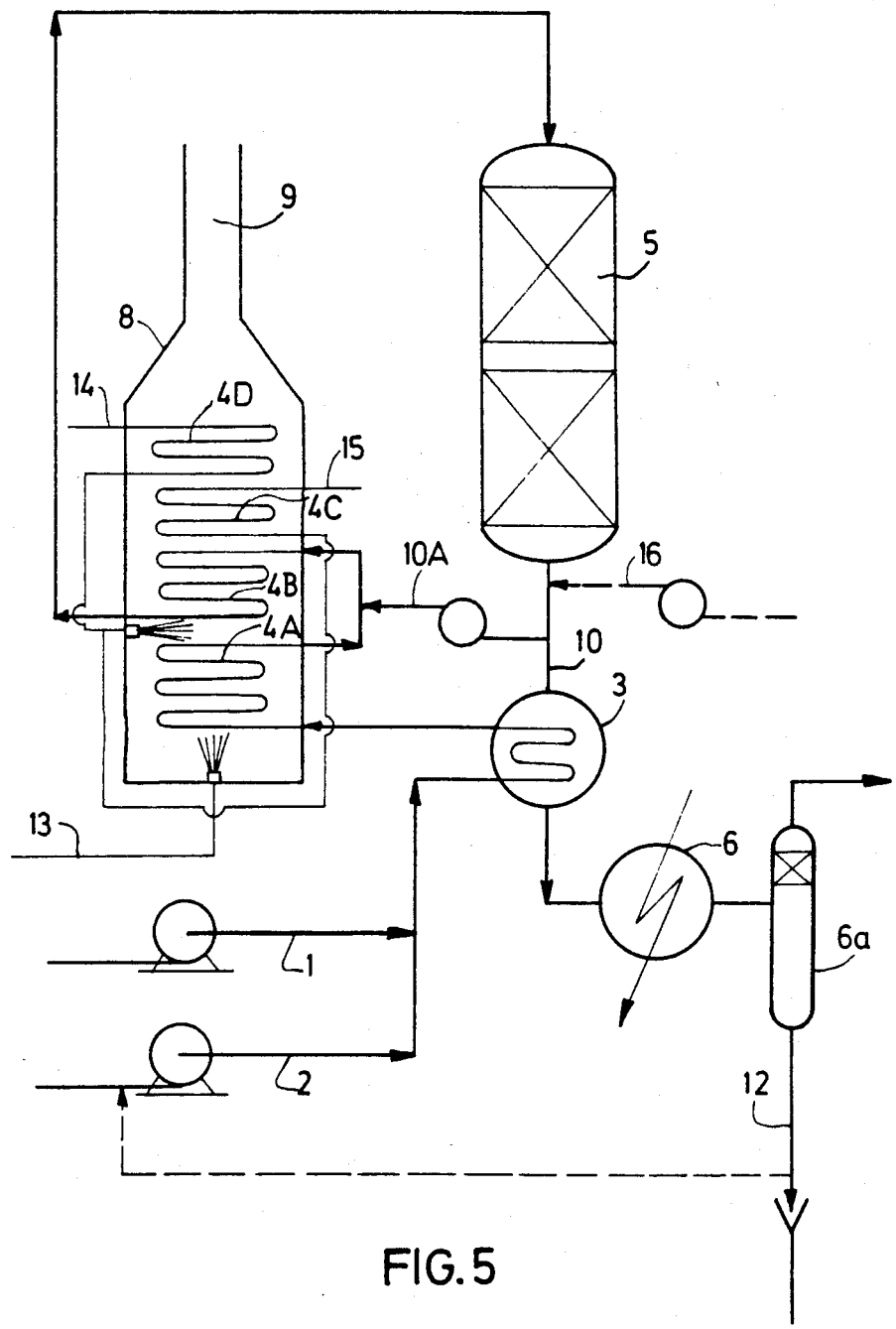
FIG. 5 shows an apparatus for producing gas having a composition different from the standard composition.

FIG. 5 illustrates an installation making possible the production of a gas of given composition different from the standard. This installation includes a pipe (10A) for recycling a fraction of gas mixture (10) coming from the reforming in the mixture of the reactants with insertion on the circuit between the first and the second superheating and a pipe (16) for introducing a gas coming from outside containing hydrogen into the reforming gas mixture (10), before recycling a part of it.

Figure 6:
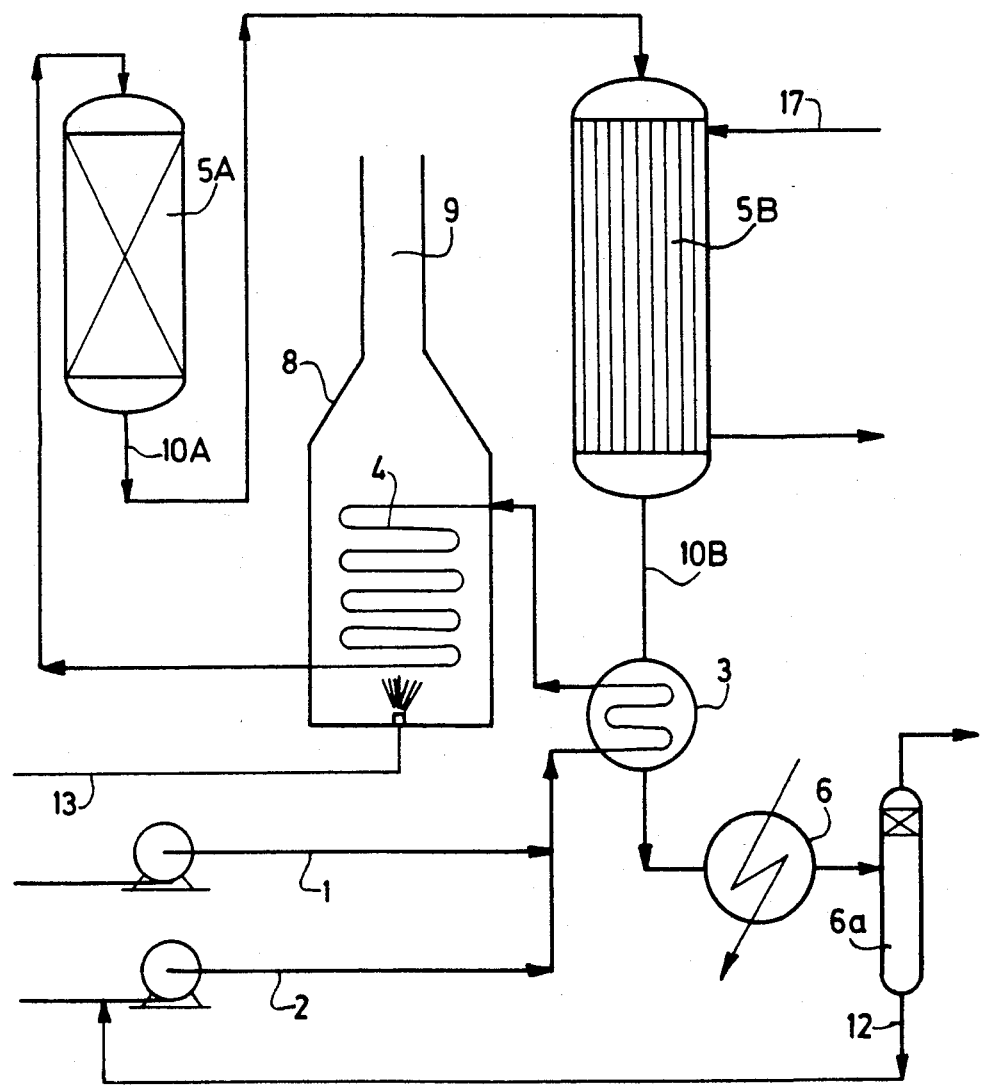
FIG. 6 shows an apparatus having an adiabatic reactor in series with a tubular reactor.

FIG. 6 illustrates an installation characterized by a coil (4) for superheating methanol-steam mixture a first adiabatic reactor (5A) in series with a second tubular reactor (5B) heated by a heat exchanging fluid circulating in (17).

DETAILED DESCRIPTION OF THE INVENTION

Figure 1:
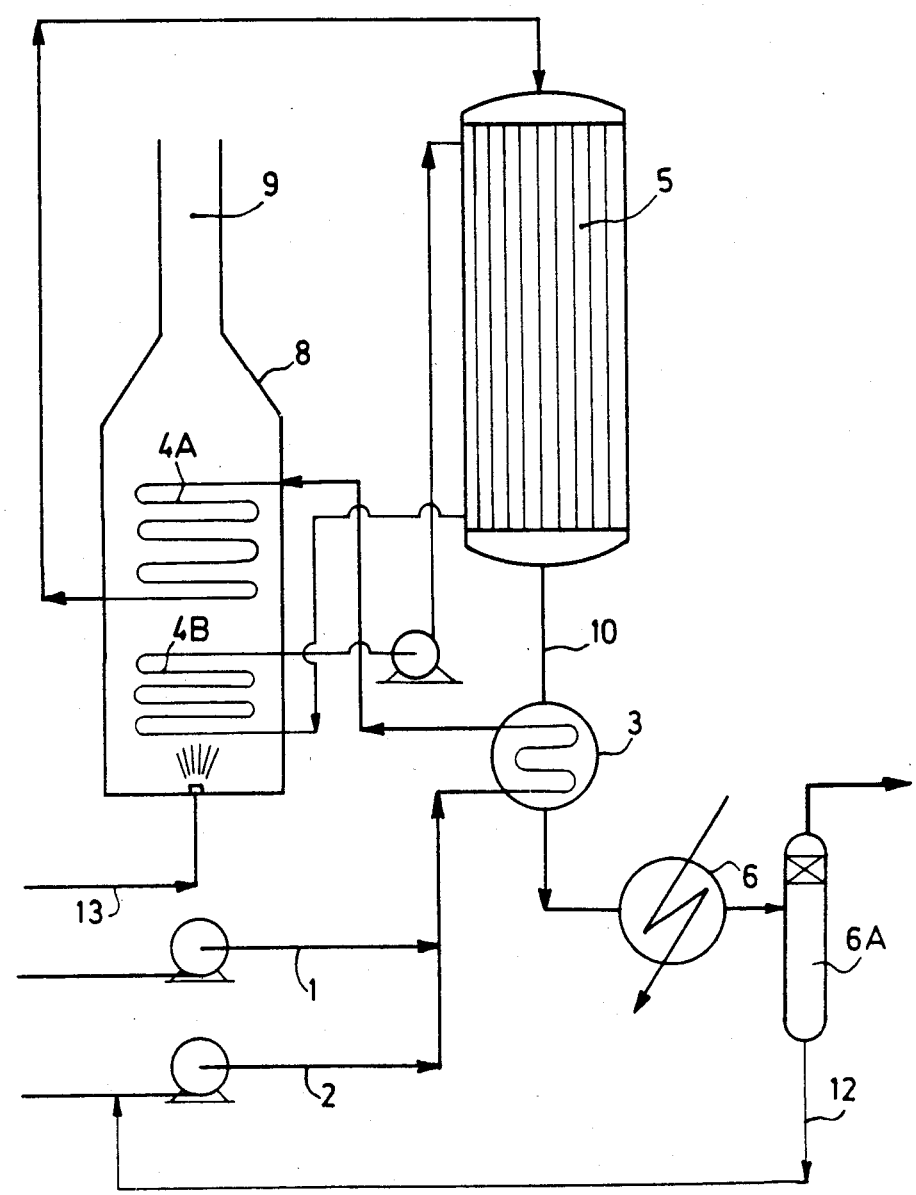
FIG. 1 shows an apparatus for reforming methanol.

Examples which illustrate the invention in a nonlimiting way are given below:

EXAMPLE 1 the steam reforming reaction of the methanol is performed in the installation shown in FIG. 1.

885 kg of catalyst having a composition by weight: ZnO:57%, $Cr_2O_3$ : 11%, CuO : 21%, $Al_2O_3$ : 11% are charged into tubular reactor (5). The reaction begins according to Example 4, French patent No. 2,490,615. After this initial phase, the operation conditions retained are those of example 7 of French patent No. 2,490,615, namely $H_2O/CH_3OH=2$ in molar ratio, output temperature of the reactor 300° C., pressure 25 bars.

The recovery yield of the purification system by molecular sieve can be increased to 75%, the mass rate of flow at the intake becomes at (1) 165 kg/h$^r$ of $CH_3OH$ and at (2), 185 kg/h$^r$/ of $H_2O$. This provides at the output of reactor (10), with the same volumetric composition as example 7, namely 1.33% CO, 18.55% $CO_2$, 58.14% $H_2$, 0.078% $CH_4$, 0.157% $CH_3OH$ and 21.753% $H_2O$, a wet gas having an hourly flow rate of 573 Nm$^3$.

The necessary amounts of heat become, respectively, to heat the feed mixture: 53,400 Kcal/hr, to vaporize it: 106,900 Kcal/hr and to superheat it to 300° C.: 14,600 Kcal/hr. The reaction heat absorbs: 76, 100 Kcal/hr. In exchanger (3), the condensation of the wet gas supplies 49,300 Kcal/hr, for the same temperature levels as example 7. In furnace (8), 247,600 potential Kcal/hr coming from the combustion of purification residual gas (13) are available having the following composition: $H_2=41.8\%$, $CO=3.7\%$, $CH_4+CH_3OH=0.5\%$, $CO_2=53.5\%$m $H_2O=0.5\%$. In practice, the heat exchanges will be be performed in 2 coils: (4A) where the liquid mixture is vaporized and superheated by 115,600 Kcal/hr, and (4B) in which the heat exchanging fluid circulates and carries 76,100 Kcal/hr to reactor (5). By lowering the temperature of the flue gases to 250° C. at (9), which can be achieved with this new installation, the surplus of calories is raised to 17,300 Kcal/hr.

The process used, performed in the installation according to FIG. 1, allows a gain of 3 points on the yield of hydrogen and is in thermal balance with 8.3% of calories in excess to compensate for the losses from the furnace.

As a variant of the above system, the steam and methanol reaction mixture is superheated to 500° C. instead of 300° C. The overall exchange of the furnace remains the same but almost half the reaction heat is thus supplied by the gas current leaving (4A), or 36,400 Kcal/hr.

The equipment of the loop of the heat exchanging fluid, in this case, becomes smaller. The volume of the catalyst of tubular reactor (5) is reduced because of the much greater reaction speed in the 500°-300° C. zone, in comparison with the 300° C. level. The first part of the reactor works in an adiabatic environment, and the addition of calories by the heat-exchanging fluid intervenes only when half the reaction has been performed.

EXAMPLE 2

The illustration corresponding to FIG. 2 refers to a unit of 5000 Nm$^3$/h of hydrogen whose operating conditions are: water/methanol molar ratio equal to 2; pressure 15 bars, maximum yield of purification equal to 80%. The chemical reaction is performed in 2 reactors (5A) and (5B), located in series and which consist simply of 2 cylindrical reactors containing the catalyst(s). They operate adiabatically; the reactants contribute the necessary heat for the reforming of methanol by steam. In each reactor half the conversion of the $CH_3OH$ is performed. The gases enter at 500° C. and leave at 300° C.

For the cited example, reactors (5A) and (5B) containing respectively the catalysts of composition according to the examples of U.S. Pat. No. 2,490,615, the mass rate and thermal balances appear as follows: 3083 kg/hr of $CH_3OH$ at (1) and 3466 kg/hr of $H_2O$ at (2) are liquid mixtures and heated under pressure to 189° C. in preheater (3) where 1,200,000 Kcal/hr are exchanged. In coil (4A) of furnaces (8) this mixture is vaporized and superheated to 500° C.; which requires 3,100,000 Kcal/hr. Reactor (5A) makes possible the reforming of 48% of the methanol to be processed, and gas mixture (10A) at 300° C. consists of 8537 Nm$^3$/hr with composition: $CO=0.3\%$, $CO_2=11.7\%$, $H_2=36.1\%$, $CH_3OH=13.2\%$, $H_2O=38.7$. Coil (4B), while exchanging 740,000 Kcal/hr, heats this fluid to 500° C., which then enters into the second reactor (5B) where the second part of the reaction is performed. Effluent (10B) at 300° C. has the same volumeteric composition as that of example 7 of the patent mentioned above. The 3406 Nm$^3$/hr of residual gas (13) whose analysis indicates: 36.7% $H_2$, 4.1% CO, 58.1% $CO_2$, 0.3% $CH_4+CH_3OH$ and 0.8% $H_2O$ will give 3,030,000 Kcal/hr on the 3,840,000 Kcal/hr to be exchanged in furnace (8), or nearly 80%. With 5% of losses on the walls and the flue gases leaving (9) at 250° C., about 95 kg/hr of booster fuel (14) are used to thermally balance the system; the liquid fuel and all combustion air (15) being preheated at (4C) and (4D) respectively.

EXAMPLE 3

This relates to a unit of 600 Nm$^3$/hr of pure hydrogen processing a contaminated methanol containing 1% ethanol, 0.5% propanol and 3% higher alcohols and fatty materials.

The operating conditions selected in this case will be the following: at the intake of the reforming installation as shown in FIG. 3, the water to methanol solution mass ratio is 1.75 corresponding to a molar ratio $H_2O/CH_3OH$+heavy impurities close to 3. Since the gasification yield of the methanol proves to be smaller than in the case of the standard $CH_3OH$ and the purification returns 80% of the hydrogen produced, the introduction at (1) of methanol solution rises to 385 Kg/hr of process water. Condensates (12) are not recycled since the majority of the impurities are found in this effluent. The pressure for the purification system is controlled at 20 bars. Flow (1) is distributed in two currents; (1A), representing 40% of the quantity of $CH_3OH$ introduced which is mixed with all the process water (2), and current (1B) which is vaporized only to 180° C. in exchanger (3B). The water methanol mixture thus prepared (1A+2) is first partially heated in (3A) then vaporized and superheated in (4A) to a temperature 470° C. The high rate of steam, on the order of 7.5, makes it possible to perform this latter operation without a carbon problem and to perform the reforming reaction in reactor (5A) containing a catalyst with composition by weight: ZnO : 71%, $Cr_2O_3$ : 22%, $Al_2O_3$ : 7%. The gases leaves at 300° C. at (10A). The second part of the methanol solution (1B) or 231 Kg/hr in the vaporized and slightly superheated form is mixed with this flow (10A) then the unit, going into furnace (8), is again at 490° C. at the output of (4B). In the second reactor (5B), containing a catalyst with composition by weight identical with example 1, completes the methanol reforming reaction. Gas mixture (10B) leaving (5B) at 300° C. serves first to heat, vaporize and slightly superheat the 231 Kg/hr of fluid (1B), then to reheat to above 140° C. the 828 Kg/hr of mixture (1A+2). Since residual gas (13) coming from the purification is not enough to contribute all the heat necessary for the system, a booster fuel is needed. If this booster fuel (14) is heated at (4D) and all combustion air (15) at (4C), on the order of 35Kg/hr of fuel will be needed with the flue gases leaving at (9) at 250° C.

EXAMPLE 4

For a unit also of 600 $Nm^3$/hr of hydrogen according to figure (4) with a molar ratio $H_2O/CH_3OH$ with a standard value of 2, a pressure of 25 bars and a purification yield of 80%, the required quantity of contaminated methanol this time is 375 Kg/hr for 422 Kg/hr of process water. This liquid mixture heated in (3) to 203° C. is vaporized and superheated in (4A) to a temperature of 425° C. It enters into first reactor (5A) containing a catalyst where 30% of the reforming reaction takes place, so that the fluid leaving at (10A) at 300° C. exhibits the following composition: CO=0.2%, $CO_2$=8.2%, $H_2$=24.8%, $CH_3OH$+impurities=19.5%, $H_2O$=47.3%. This gas current heated to 440° C. in (4B) enters into second sector (5B) containing 350 Kg of catalyst where 35% additional $CH_3OH$ reacts. At (10B), the reacted gases at 300° C. have the new composition: CO=0.6%, $CO_2$=14.5%, $H_2$=44.8%, $CH_3OH$+impurities=8.2%, $H_2O$=31.9%. A final passage into exchanger (4C) of furnace (8) raises the temperature level to 43≦C., which makes it possible to perform the end of the reforming reaction in third reactor (5C) containing 350 Kg of catalyst. The gas entering the purification scarcely differs from that of Example 7. The condensates gathering the majority of the possible impurities are, in this case, preferably rejected and not recycled. By way of comparison with example 10, about 10 Kg/hr of booster fuel, in the form of fuel, are to be burned in addition to residual gas (13) coming from the purification to satisfy the caloric demand of the furnace; the flue gases leave (9) at about 250° C. after having heated oxygen carrier (15) and fuel (14) at (4D) and (4E).

EXAMPLE 5

In the installation according to FIG. 5, at the output of reactor (5), a gas (16) containing hydrogen or another element can be recovered and introduced into the system. Also, a part of gas fluid (10A) coming from (5) has the possibility of being recycled.

This recycling fluid therefore serves as both heat-exchanging fluid and means for causing the composition of the gas to vary, by changing the chemical balances. By selecting the simpliest case at a recycling rate 1/1, or a volume of recycling gas at (10A) for an extracted volume at (10) (which does not affect the composition of the gas) it is shown that the reforming reaction is performed in a single superheating pass of the reactants.

Taking example No. 2 again, after heating the 6549 kg/hr of the methanol-water-(1+2) liquid mixture in exchanger (3), these fluids are vaporized and slightly superheated in (4A). To these 6471 $Nm^3$/hr of reactants is added half the gas current leaving at 300° C., from reactor (5), or 8537 $Nm^3$/hr. All these 15008 $Nm^3$/hr is then superheated in (4B) up to 495° C., which is enough to provide the reaction heat for the adiabatic reforming of the 3083 kg/hr of methanol. The composition of the gas flow leaving (5) is the same as in cited example No. 2 but the hourly flow rate is double, i.e., 17074 $Nm^3$/hr. The amount of heat to be provided in the furnace remains identical, but the energy for recirculation of gas (10A) must be added. For indication in this example, a motor with about 100 hp must be installed to recompress, by 1.5 bars, the 8037 $Nm^3$/hr of gas to be recycled.

EXAMPLE 6

If the conditions of example (1) are taken again, according to the installation of FIG. 6, with a yield of 80%, the mass rates of flow in this particular case become 155 kg/hr at (1) and 174 kg/hr at (2). In exchanger (3), the liquid mixture receives 55700 Kcal/hr. To superheat this mixture to 500° C., it must be provided in coil (4) with: 137100 Kcal/hr. Adiabatic reactor (5A) performs about half the reforming reaction, the effluents thus leaving at 300° C. Tubular reactor (5B) completes the conversion of the methanol by absorbing 37,300 Kcal/hr, contributed from the outside by a heat exchanging fluid (17). For an output temperature at (10B) 538 $Nm^3$/hr of wet gas of the same composition as example (7) of said patent circulates. On the other hand, at (13) the composition of the residual gas becomes: $H_2$=36.5%, CO=4.0%, $CH_4$+$CH_3OH$=0.6%, $CO_2$=58.3%, $H_2$=36.5%, CO=4.0%, $CH_4$+$CH_3OH$=0.6%, $CO_2$=58.3%, $H_2O$=0.6% for an hourly flow rate of 171 $Nm^3$. For an output temperature of flue gases of 250° C. at (9), furnace (8) will have 160,300 potentially exchangeable Kcal/hr, which releases a surplus of 23,200 Kcal/hr representing 14.4%.

We claim:

1. A methanol reforming process for obtaining a gas with a high hydrogen content, comprising vaporizing and superheating a methanol-water reacting mixture directly inside of a combustion zone of a residual gas obtained from the purification of product from methanol reforming, at a temperature ranging from 300° to 500° C.; effecting a first stage methanol reforming of said superheated methanol-water reaction mixture; passing reaction mixture from said first stage reforming inside the combustion zone of the residual gas for a second heating therewithin; and effecting a second stage methanol reforming of the reaction mixture subjected to said second heating within the combustion zone of said residual gas.

2. A methanol reforming process according to claim 1, wherein a booster fuel burned in said combustion zone contributes additional heat necessary to effect said reforming in at least one said stage adiabatically.

3. A methanol reforming process according to claim 1 wherein all of the reforming reaction is conducted under adiabatic operating conditions.

4. A methanol reforming process according to claim 3 wherein said methanol reforming is carried out in three stages in series under adiabatic operating conditions, and wherein the input temperature of reaction mixture to each stage is on the order of 430° C.

5. A methanol reforming process for obtaining gas with a high hydrogen content, comprising vaporizing and superheating a methanol-water reaction mixture directly inside of a combustion zone of a residual gas obtained from the purification of product from methanol reforming, at a temperature of 300°-500° C.; effecting a first stage methanol reforming of said superheated methanol-water reaction mixture adiabatically; passing reaction mixture from said adiabatic first stage reforming to a second stage methanol reforming zone; providing a heating fluid in heat exchange relationship to said second reforming zone; and effecting further reforming in said second reforming zone.

6. A methanol reforming process for obtaining gas with a high hydrogen content, comprising vaporizing and superheating a methanol-water reaction mixture directly inside of a combustion zone of a residual gas obtained from the purification of product from methanol reforming, at a temperature of 300°–500° C.; providing a second gas selected from the group consisting of a recycled fraction of reformed product gas, a secondary feed gas comprising hydrogen, and a combination of said secondary feef and said recycled product gas; superheating said second gas and combining said second gas with said methanol-water reaction mixture; and effecting adiabatic reforming of the superheated combined mixture of said second gas and said reaction mixture at a temperature of 300°–500° C.

7. A methanol reforming process according to claim 6 wherein said second gas at least partially comprises said fraction of recycled product, and wherein said second gas is combined with said methanol-water reaction mixture after said reaction mixture has been superheated in said combustion zone and before said second gas has been superheated in said combustion zone.

* * * * *